US007567786B2

(12) United States Patent
Bjerede

(10) Patent No.: US 7,567,786 B2
(45) Date of Patent: Jul. 28, 2009

(54) HIGH-DYNAMIC-RANGE ULTRA WIDE BAND TRANSCEIVER

(76) Inventor: Bjorn Bjerede, 603 Bonair Way, La Jolla, CA (US) 92037

( * ) Notice: Subject to any disclaimer, the term of this patent is extended or adjusted under 35 U.S.C. 154(b) by 733 days.

(21) Appl. No.: 11/177,024

(22) Filed: Jul. 9, 2005

(65) Prior Publication Data

US 2007/0177653 A1    Aug. 2, 2007

Related U.S. Application Data

(60) Provisional application No. 60/586,817, filed on Jul. 10, 2004.

(51) Int. Cl.
*H04B 1/26* (2006.01)
*H04B 7/00* (2006.01)
*H04B 1/06* (2006.01)

(52) U.S. Cl. .................... 455/196.1; 455/255; 455/315

(58) Field of Classification Search ............. 455/196.1, 455/192.1, 199.1, 255, 260, 275, 316, 131, 455/139, 165.1, 113, 118, 75, 71, 209
See application file for complete search history.

(56) References Cited

U.S. PATENT DOCUMENTS 6,243,567 B1 *  6/2001  Saito ....................... 455/188.2

* cited by examiner

*Primary Examiner*—Eugene Yun
(74) *Attorney, Agent, or Firm*—Merle W. Richman

(57) ABSTRACT

An UWB Transceiver for Multi-Band OFDM communication including an antenna switch (342), a receive front end and down-converter (303), an up-converter and power amplifier (305), and a frequency synthesizer (211). The transceiver achieves high dynamic range by employing a synthesizer (211) with very low spurious components and a receive front end with an efficient receive RF filtering embodiment. The synthesizer (211) may rapidly switch frequencies in a manner that minimizes spurious components outside the band group used for communication. The receiver (200) also achieves high selectivity and sensitivity by dividing the receive signal path into even and odd band groups.

30 Claims, 8 Drawing Sheets

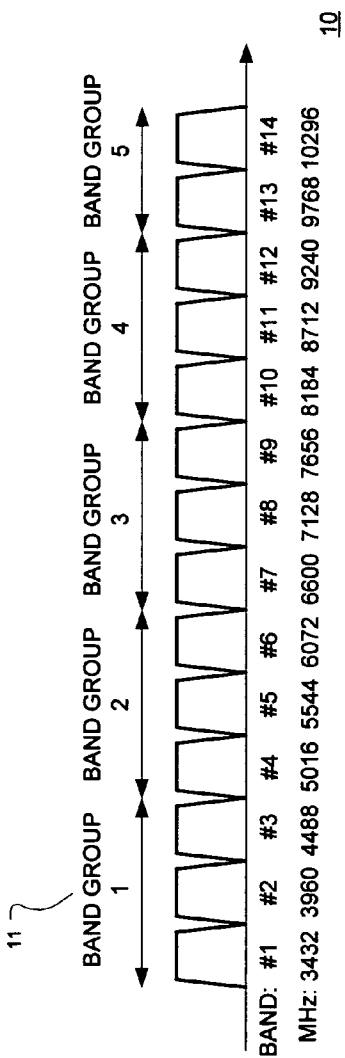
FIG. 1 – PRIOR ART
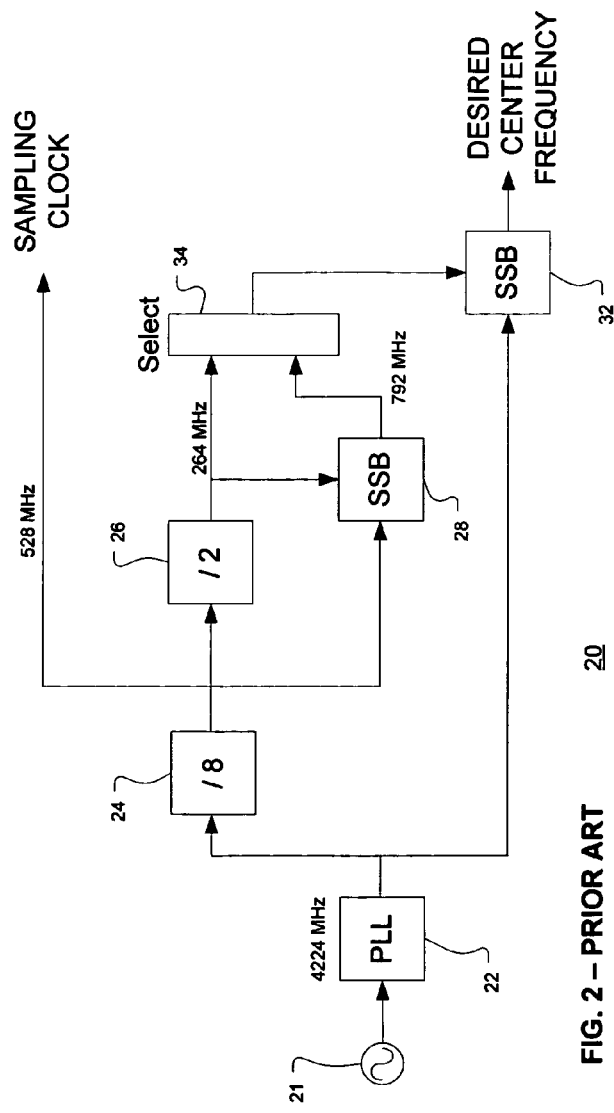
FIG. 2 – PRIOR ART

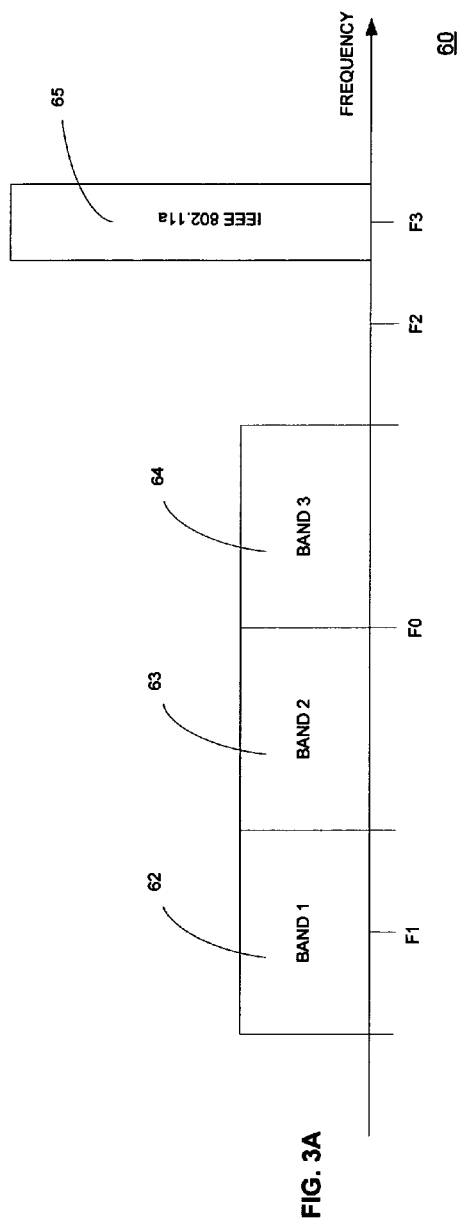
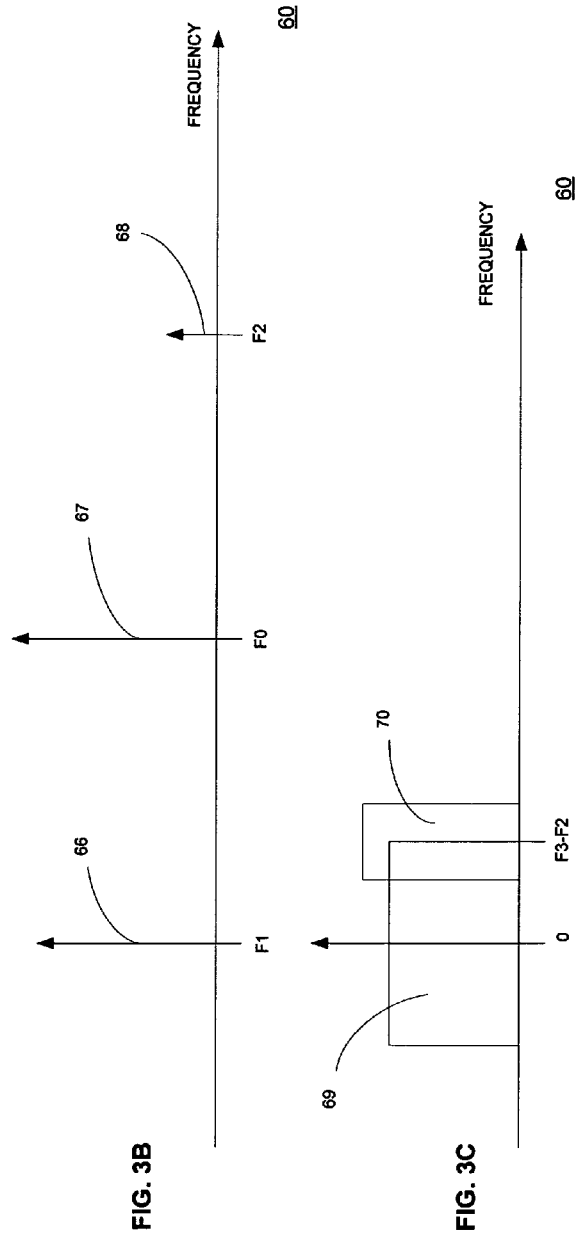
FIG. 3A
FIG. 3B
FIG. 3C

HIGH-DYNAMIC-RANGE ULTRA WIDE BAND TRANSCEIVER

CROSS REFERENCE TO RELATED APPLICATIONS

The present application for patent claims priority to Patent Application No. 60/586,817, entitled "High-Dynamic-Range Multiband Ultra Wide Band Receiver," filed 2004 Jul. 10, 2004 by the present inventor and assignee, and hereby expressly incorporated by reference herein.

BACKGROUND

1. Field of the Invention

This invention pertains generally to systems and methods for wireless communications. More particularly, the invention relates to improvements in radio architecture for ultra wide band radios.

2. Description of Related Art

Wireless communication protocols are commonly used for voice and data communication. Proposed Ultra Wideband (UWB) wireless communication protocols are being developed to provide high data rate communication for numerous applications including wired communication replacement, such as USB cables and delivery of high data rate video and voice. The applicant has noted that UWB systems may need to consider interference generated by other wireless protocols such as IEEE 802.11a and wireless telephones communication protocols.

Wireless industry groups are working to provide standard protocols for UWB wireless communication including the standard setting committees of IEEE and other independent, organizations. In particular, a Multiband OFDM Alliance has proposed a communication protocol that uses frequency hopping combined with Orthogonal Frequency Division Multiplexing ("OFDM"), termed MB-UWB. Applicant notes systems employing such a protocol should be inexpensive, able to operate over or effectively utilize a large portion of any allocated UWB frequency range, and handle strong interference. The present invention provides such a system.

SUMMARY OF THE INVENTION

The present invention includes an Ultra Wideband (UWB) transceiver comprising: a downconverter, an upconverter, and a frequency synthesizer. The transceiver can rapidly switch between the three frequencies contained in any one band group by employing a synthesizer that combines the desired synthesizer center frequency with a second frequency equal to the synthesizer frequency spacing, whereby said transceiver transmits and receives frequency-hopped communications signals in the UWB frequency range. The present invention enables communication of UWB signals while rejecting strong interfering signals. The present invention includes circuitry able to handle large interfering power levels without compression. The invention also generates local oscillator ("LO") signals that contain no or very low spurious components outside the operation band group. The present invention also includes Radio frequency (RF) filters that suppress interfering signals.

The present invention also includes a method of and a transceiver for radio communication over at least three, equally spaced bands. The transceiver may include a frequency synthesizer for creating a local oscillator ("LO") for each of the at least three bands. In an embodiment the synthesizer may including means for generating a first LO for one of the at least three bands, means for generating a second LO set to the spacing between two adjacent bands of the at least three bands and means for combining the first LO and the second LO to generate a LO for each of the at least three bands.

In an embodiment the means for generating the first LO may include a phase locked loop ("PLL"). The means for generating the second LO may include a phase locked loop ("PLL"). The first LO may be equal to the frequency of the center of the at least three bands and the second LO may be equal to the distance between the center of the at least three bands and an adjacent band of the at least three bands. In addition, the transceiver may communicate over a plurality of band groups, each band group having at least three, equally spaced bands.

In an embodiment the means for generating a first LO may include includes means for generating a first LO for one of the at least three bands of a selected band group. Further the transceiver may communicate over the at least three, equally spaced bands via a frequency hopping protocol. The transceiver may also include means for converting a received signal into in-phase and quadrature signals. In an embodiment at least a portion of the means for converting a received signal into in-phase and quadrature signals and at least a portion of the frequency synthesizer may be integrated together in a single integrated circuit. Also the frequency synthesizer may include means for dividing the plurality of band groups into even and odd groups.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 (PRIOR ART) is a block diagram of a frequency spectrum including a proposed MB-OFDM UWB protocol's frequency bands that the present invention may employ;

FIG. 2 (PRIOR ART) is a block diagram of a proposed MB-OFDM UWB synthesizer;

FIG. 3A depicts a frequency spectrum including MB-OFDM protocol bands 1 through 3 and a possible interfering signal;

FIG. 3B depicts a frequency spectrum including MB-OFDM protocol synthesizer signals corresponding to bands 1 through 3 and the interfering signal;

FIG. 3C depicts a frequency spectrum including MB-OFDM protocol synthesizer signals corresponding to bands 1 through 3 after quadrature down conversion;

DETAILED DESCRIPTION

Figure 4:
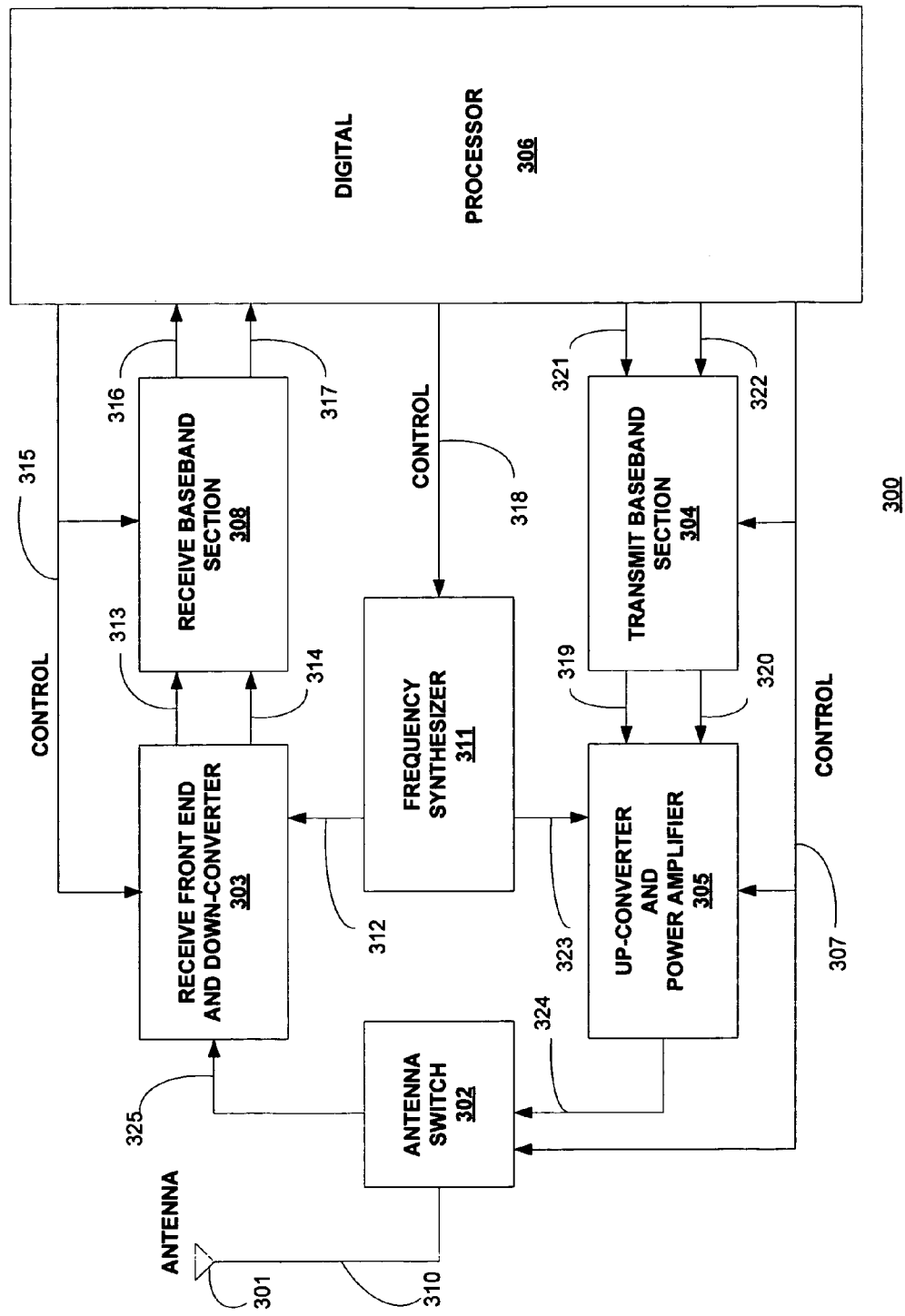
FIG. 4 is a functional block diagram of a UWB transceiver according to an embodiment of the present invention.

Throughout this description, embodiments and variations are described for the purpose of illustrating uses and implementations of the invention. The illustrative description should be understood as presenting examples of the invention, rather than as limiting the scope of the invention.

FIG. 1 (PRIOR ART) is a block diagram of a frequency spectrum 10 including a proposed MB-OFDM UWB protocol's frequency bands that the present invention may employ. In the proposed MB-UWB protocol 11, the UWB frequency range is divided into 14 frequency bands, each 528 MHz wide where each band group contains three bands, except group 5. In the proposed protocol the first frequency band is centered at 3.432 GHz and extends from 3.168 GHz to 3.696 GHz. The second frequency band is centered at 3.96 GHz and extends from 3.696 GHz to 4.224 GHz, and remaining bands following the same pattern. The first band group contains the first three frequencies. It is centered at 3.96 GHz and extends from 3.168 GHz to 4.752 GHz. The second, third, and fourth band group contain the following three frequencies. The fifth band group contains just two frequencies. The proposed protocol employs OFDM modulation with frequency hopping within the five band groups.

In the protocol each receiver may be assigned a band group and may communicate by rapidly hopping between the three frequencies within the assigned band group using predetermined hopping patterns. Accordingly, a frequency synthesizer must hop frequencies over the three frequencies assigned to the band group in accordance with the assigned hopping pattern. To employ the proposed protocol a frequency synthesizer ideally generates a pure frequency signal with no sidebands or spurious frequencies and changes frequency with negligible delay. Synthesizers may have spurious frequencies that could mix with interfering signals to generate interference in the baseband portion after quadrature I/Q down conversion. Phase locked loop frequency synthesizers may have limited spurious frequencies and may be implemented with few components; however phase locked loop frequency synthesizers may not switch quickly enough. Direct synthesizers that may generate a desired frequency by mixing, frequency multiplying, and dividing signals may switch quickly enough but may generate high levels of spurious mixing frequencies.

FIG. 2 (PRIOR ART) is a block diagram of a proposed MB-OFDM UWB synthesizer 20. The synthesizer 20 includes a oscillator 21, a phase locked loop 22, a eight to one divider 24, a two to one divider 26, a first Single Side Band ("SSB") 28, a second SSB 32, and a selector 34. In the synthesizer 20 to generate a local oscillator ("LO") signal for frequency F1 (3432 MHz), a frequency F0 (4224 MHz) generated by PLL 22 is mixed with a signal having a frequency of 792 MHz, generated by divider 24 and SSB 28. The synthesizer 20 may generate a spurious frequency component (results from the image frequency and falls on) 4224+792 MHz=5016 MHz. In addition, interference from the 5150 to 5350 MHz band may be translated into interference ranging from 134 MHz to 334 MHz by this spurious component. Accordingly, interference from a lower frequency IEEE 802.11a signal may directly interfere with a desired signal having a frequency range of −264 MHz to +264 MHz. The interference from IEEE 802.11a signal may be very strong, in particular in personal computers and laptops that contain antennas for UWB signals as well as IEEE 802.11a signals.

FIGS. 3A, 3B, and 3C depict frequency spectrum may that be generated by synthesizer 20. FIG. 3A depicts a frequency spectrum including MB-OFDM protocol bands 1 through 3 and a possible interfering signal (802.11a signal). FIG. 3B depicts a frequency spectrum including MB-OFDM protocol synthesizer signals corresponding to bands 1 through 3 and the interfering signal. FIG. 3C depicts the frequency spectrum including MB-OFDM protocol synthesizer signals corresponding to bands 1 through 3 after quadrature down conversion. In addition, the synthesizer 20 has a limited frequency range. Designs that cover only the first band group may be susceptible to interference in this band. A design such as the current invention that covers multiple bands may avoid interference by selecting band groups that are free of interference.

Figure 8:
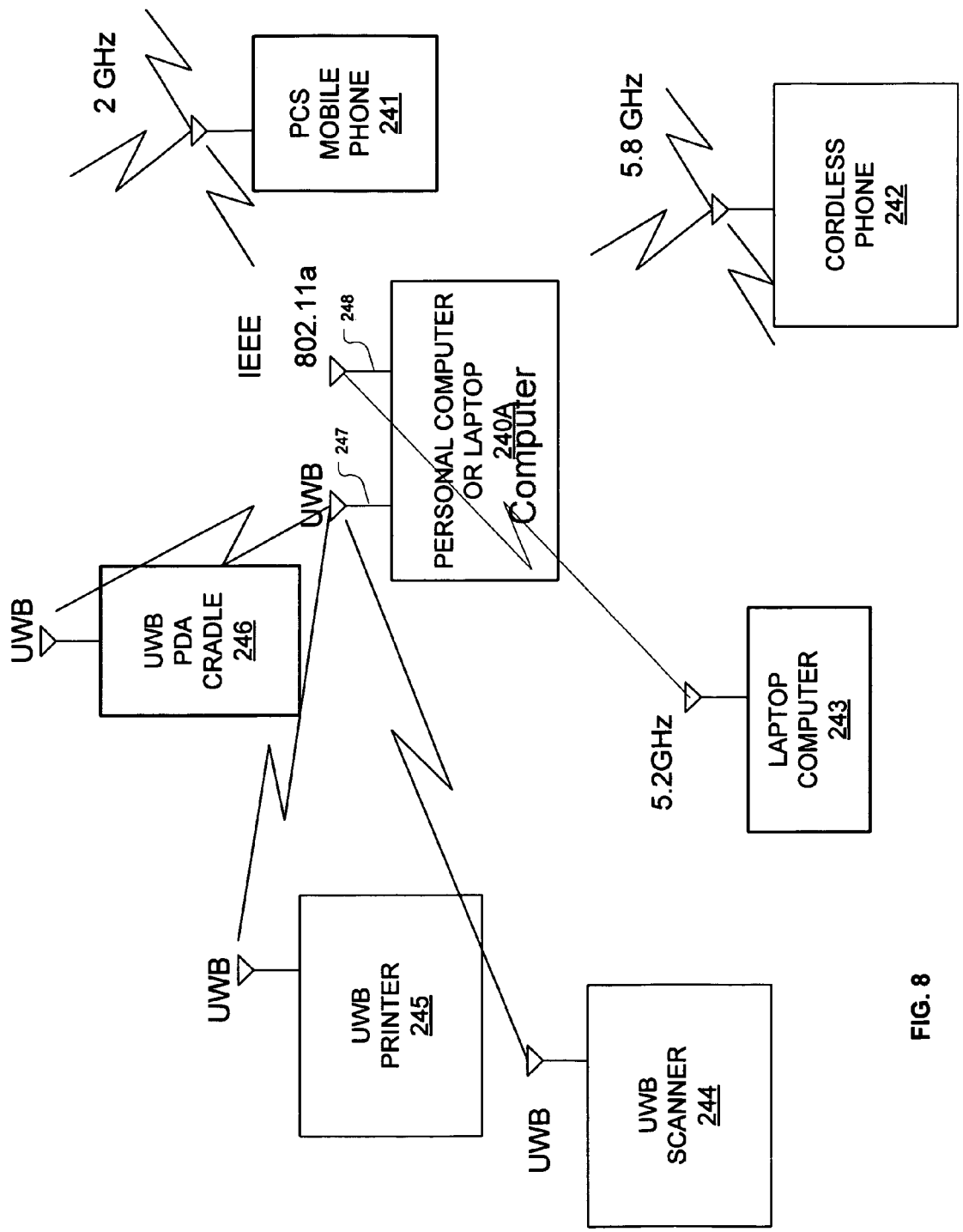
FIG. 8 is a block diagram of wireless architecture including a UWB communication system and other wireless communication systems creating potential interference.

An embodiment of the invention provides a high-dynamic-range receiver for UWB communication. The receiver is capable of accurately receiving low level UWB signals while rejecting strong interference that may fall inside our outside the 3.1 to 10.7 GHz UWB frequency band. Such interference may for instance come from other wireless communication systems which are all connected to the same computer as shown in FIG. 8. The invention is mainly aimed at, but not limited to, a specific proposed UWB standard, the MB-OFDM Version 0.9 standard proposed to the IEEE P802.15 Working Group for Wireless Personal Area Networks (WPAN) and future versions of this standard.

FIG. 4 is a functional block diagram of a UWB transceiver 300 according to an embodiment of the present invention. The transceiver 300 includes an antenna 301, antenna switch 302, receive front end and down converter 303, transmit baseband section 304, up-converter and power amplifier 305, a digital processor 306, a receive baseband section 308, and a frequency synthesizer 311. In an embodiment a near direct conversion transceiver would be similar to the transceiver 300 other than having a frequency offset of 264 MHz in the receive and transmit baseband sections 303 and 304. In an embodiment the elements 302, 303, 304, 305, 306, 308, and 311 may be implemented in a set of integrated circuits or in a single integrated circuit. In an embodiment the antenna switch 302 may be implemented in Gallium Arsenide (GaAs), Silicon on Insulator (SOI), or using PIN diodes. In an embodiment the other elements may be integrated into a single IC. In an embodiment the digital processor 306 may or may not be an integrated part of the overall transceiver 306.

In receive mode the antenna 301 feeds received signals 310 to the antenna switch 302. In an embodiment the antenna switch 302 may also contain a high pass filter to suppress interference from frequencies below 3.1 GHz, such as the Bluetooth, PCS and cellular bands. The antenna switch 302 filter may also help suppress emissions below 3.1 GHz in transmit mode. The antenna switch 302 passes the received signals 325 to the receive front end and down-converter 303. The receive front end and down-converter 303 amplifies, filters and down-converts the received signal to baseband in-phase ("I") and quadrature ("Q") signals 313, 314. The resulting 313, 314 signals are amplified and filtered by the receive baseband section 308 that in turn passes the resulting signals 316, 317 to the digital processor 306 for further processing. In an embodiment analog-to-digital ("A/D") converters and digital-to-analog ("D/A") converters (see FIG. 5B, 225, 226) may be part of the digital processor 306 or the baseband sections 303 and 304.

In an embodiment the digital processor 306 provides control signals to the analog elements 303, 304, 305, 302, and 308 of the transceiver 300. These control signals may set the antenna switch 302 state, the frequency synthesizer LO, the receive gain, and the transmit level among other things. In an embodiment the frequency synthesizer 311 generates accurately tuned signals, 312 and 323, that are used to down-convert the received signals and up-convert the transmit signals. In transmit mode the digital processor 306 provides modulated I and Q signals 321, 322 to the transmit baseband section 304 that filters the signals and in turn provides them 319, 320 to the up-converter and power amplifier section 305. The up-converted and amplified RF signals 324 are then fed to the antenna switch 302 for transmission 310 via the antenna 301.

Figure 5A:
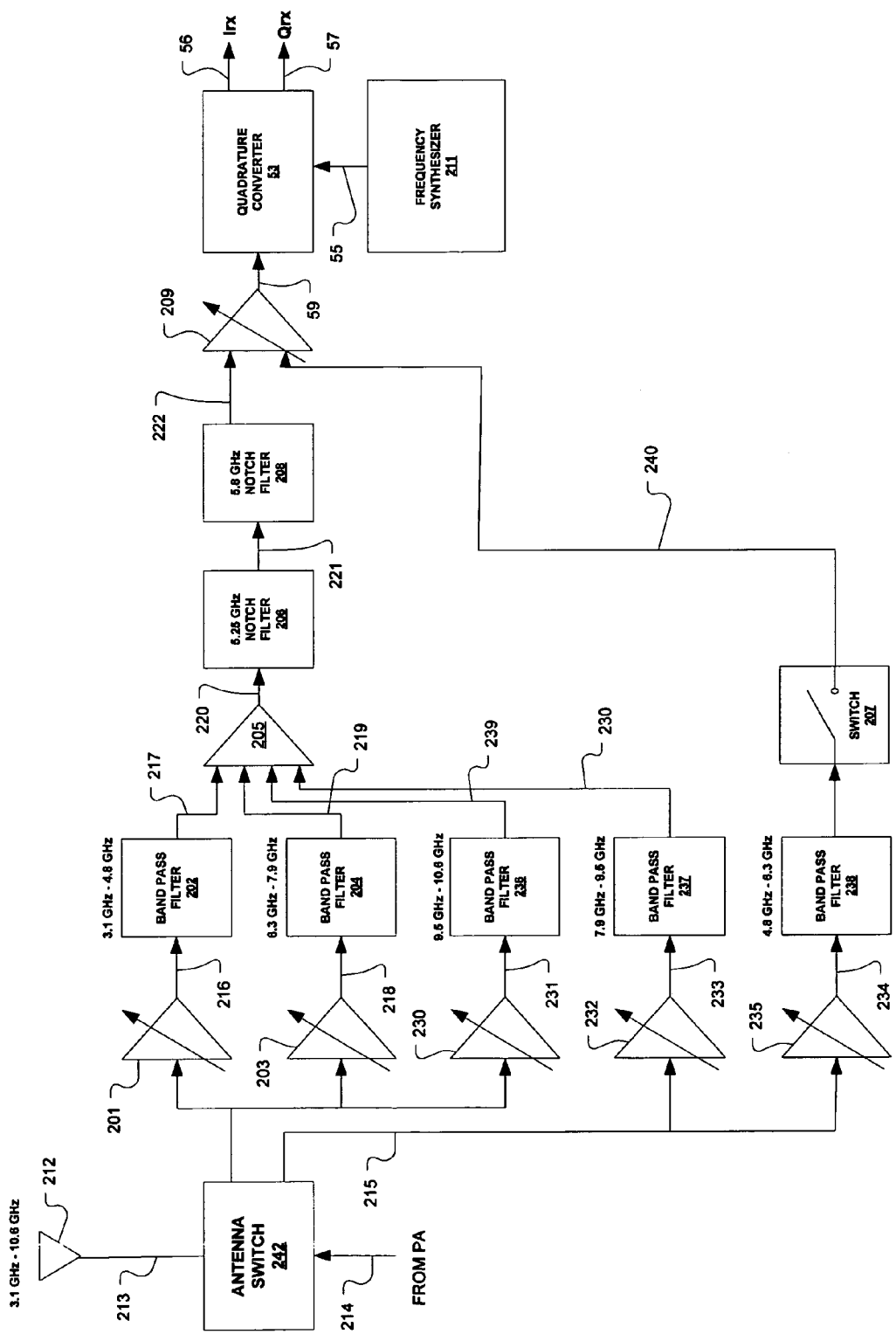
FIG. 5A is a functional block diagram of the RF portion of a direct conversion receiver according to an embodiment of the present invention.
Figure 5B:
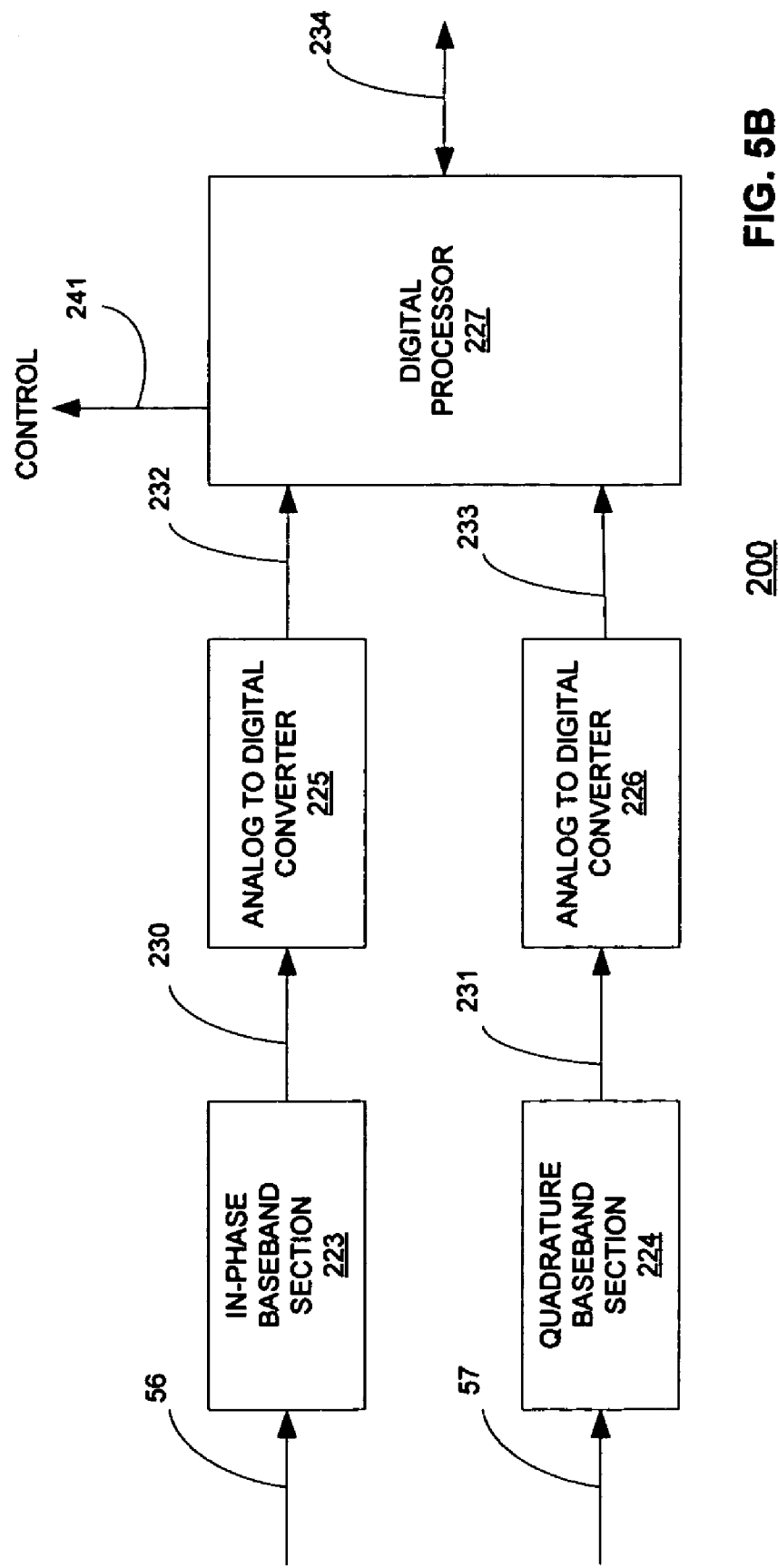
FIG. 5B is a functional block diagram of the baseband section of the UWB receiver according to an embodiment of the present invention.

FIGS. 5A and 5B show block diagrams of an embodiment of a direct down-conversion MB-UWB receiver (5A shows the RF section and 5B the baseband section). The receiver 200 includes an antenna 212, antenna switch 242, amplifiers 201, 203, 230, 232, and 235, band-pass filters 202, 204, 236, 237, and 238, amplifier 205, notch filters 206 and 208, amplifier 209, quadrature converter 53, frequency synthesizer 211, in-phase and quadrature baseband sections 223 and 224, A/D converters 225, 226, and digital processor 227. The entire receiver 200 may be implemented as an integrated circuit or it may be part of an integrated transceiver IC in an embodiment.

In the receiver 200, RF communication signals are received by the antenna 212 and connected to the antenna switch 242 via path 213. In receive mode the antenna switch 242 feeds the received signal 213 to two amplifier filter combinations or groups. In an embodiment one group includes the amplifiers 201, 203 and 230 connected via 216, 218 and 231 to the band pass filters 202, 204 and 236. The other amplifier group includes the amplifiers 232 and 235 connected via 233 and 234 to the band-pass filters 237 and 238. The band pass filters 202, 204, 236 and 237 outputs are fed to an amplifier 205. Only one of the amplifiers 201, 203, 230, 232 and 235 are active at any one time. In an embodiment amplifier 201, 235, 232, 230 is active for band group 1, 2, 3, 4, 5, respectively. The amplifier 205 receives an output from filters 202, 204, 236 and 237 and is switched off when band group 2 is active. For band group 2 the filter 238 output is fed to one of the inputs of the amplifier 209 via a switch 207. The switch 207 is off for all other band groups, 1, 3, 4, and 5.

For band groups 1, 3, 4, and 5 the amplifier 205 output is fed to notch filter 206 and 208. These filters suppress interference from IEEE 802.11a and other signals that exist in the 5 to 6 GHz frequency spectrum. The notch filter signals 222 are fed to one of the inputs of amplifier 209. The amplifier signal 59 is passed to the quadrature converter 53. The quadrature converter outputs 56, 57 are filtered and amplified by the baseband sections 223 and 224. The signals 230, 231 are then fed to analog-to-digital converters 225 and 226. The digital signals 232, 233 are fed to the digital processor 227 for subsequent processing. In an embodiment, the analog-to-digital converters 232, 233 may be incorporated into the digital processor 227. In an embodiment the frequency synthesizer 211 provides local oscillator signals over the line 55 to the quadrature converter 53.

Figure 6A:
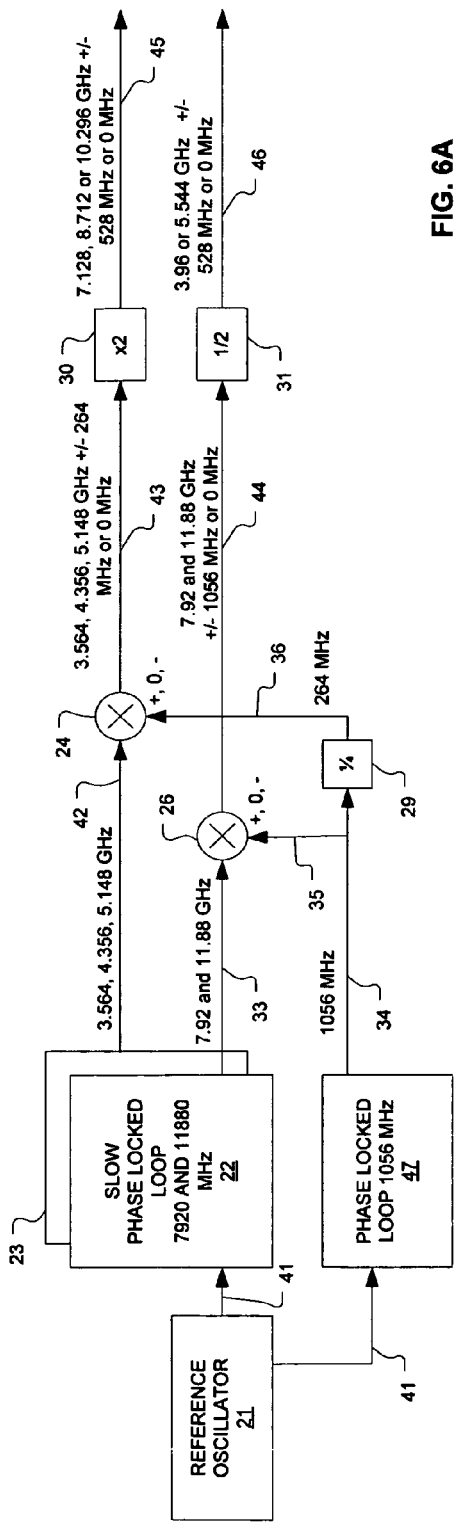
FIG. 6A is a functional block diagram of a first segment of a frequency synthesizer of the UWB receiver or transmitter according to an embodiment of the present invention.
Figure 6B:
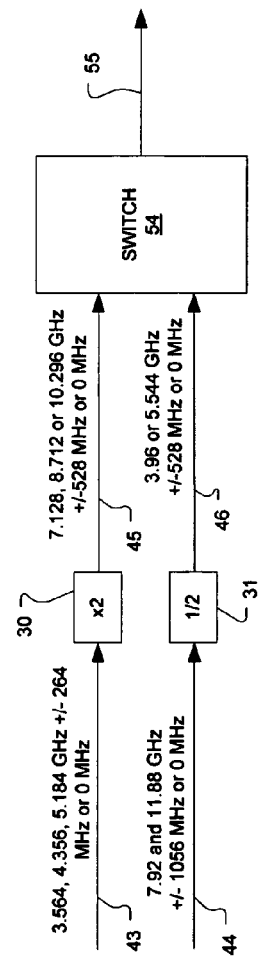
FIG. 6B is a functional block diagram of a second segment of a frequency synthesizer of the UWB receiver or transmitter according to an embodiment of the present invention.

FIGS. 6A and 6B are block diagrams of segments of an embodiment of frequency synthesizer 211 that may be employed in the receiver 200. The frequency synthesizer 211 includes a reference oscillator 21, PLLs 22, 23, 47, mixers 24, 26, dividers 29, 31, a multiplier 30, and a switch 54. In the embodiment the reference oscillator 21 generates and feeds an accurate reference frequency signal 41 to phase locked loops 22, 23, and 47. The PLL 47 generates a 1056 MHz frequency signal 34 from the reference signal 41. The four to one divider 29 converts the 1056 MHz signal 34 into a 264 MHz signal 36. The output of the phase locked loop 22 is mixed in mixer 26 with a 1056 MHz frequency 34 generated by the phase locked loop 47. The output of phase locked loop 23 is mixed in mixer 24 with the 264 MHz signal 36.

The frequency doubler 30 generates the final frequencies 45 by multiplying the output 43 of the mixer 24 by two. The divider 31 generates the final frequencies 46 by dividing the output 44 of the mixer 26 by two. As shown in FIG. 6B the switch 54 is used to select the final frequency. In an embodiment the mixers 24 and 26 are image reject mixers that may output three possible frequencies: the sum of the two frequencies applied, the difference of the two frequencies applied, or the frequency generated from the phase locked loops 22 or 23. In an embodiment the frequency doubler 30, the frequency divider 31, and the switch 54 are all integrated into the mixer structures 53 (as shown in FIG. 5A) to minimize any leakage of the final frequency LO signals into the receive RF front end.

As noted FIG. 5A and FIG. 5B show segments of an UWB direct conversion or near direct conversion receiver 200. In an embodiment the receiver 200 may directly convert the received MB-OFDM signals to baseband signals without using an intermediate frequency IF. In an embodiment the receiver 200 may convert received signals to a low IF frequency of 264 MHz, which means that the receive spectrum extends from zero frequency to 528 MHz in the baseband section. In an embodiment the receiver components, except the antenna switch 242, and the frequency synthesizer 211 may be integrated into a single integrated circuit along with most of the transmit circuitry. In an embodiment the RF filters 202, 204, 236, 237, and 238 shown in FIG. 5A may be part of the integrated circuit. In the receiver 200, RF signals are amplified, filtered, and applied to a quadrature converter 53. The quadrature converter 53 generates two baseband signals, I and Q, at its output lines 56 and 57. The baseband sections 223 and 224 amplify and low pass filter the I and Q signals from the desired frequency band and suppresses all other signals. In an embodiment a frequency band 1 to 5 is selected by simply setting the frequency synthesizer 211 output frequency to the frequency center band that is to be received and selecting the appropriate amplifier 201, 203, 230, 232, or 235.

The RF and baseband sections (shown in FIGS. 5A and 5B) may also provide variable gain that insures that the signal levels are appropriate throughout the receive chain from the antenna 212 to the baseband signals at the output lines 230 and 231. In an embodiment the digital samples on lines 232 and 233 contain the information to be used by the digital processor 227 to demodulate the received MB-OFDM symbols as well as adjusting the gain in the amplifiers 216, 218, 209 and the baseband sections 223 and 224. Applicant notes that a DC offset present at the quadrature converter 53 output lines 56 and 57 may be amplified by the baseband sections 223 and 224, which may cause problems with the analog to digital converters 225 and 226 and subsequent digital processing. In particular DC offsets that vary with the tuned frequency or with gain changes in the amplifiers 201, 203 and 209 may be cause compensation issues.

In addition, the local oscillator signal present on line 55 may leak into the RF front end, be amplified by the RF amplifiers 201, 203, 205 and 209 and then fed back to the quadrature converter 53. This effect may generate variable DC offsets at the output lines 65 and 57 of the quadrature converter 53. In an embodiment the receiver 200 generates the final LO signals in balanced circuits embedded with the quadrature converter mixers to minimize any leakage of LO signal into the RF front end circuits including the amplifiers 201, 203, 205, and 209 as well as other components such as the RF filters 202, 203, 206, 208 and the antenna switch 242 and the antenna 212. In an embodiment the frequency synthesizer 211 is divided into two sections as shown in FIGS. 6A and 6B, 6A containing most of the circuitry and a second section that generates the final LO frequency from the two signals on line 55. The signal 55 may contain LO leakage into the RF front end. In an embodiment the receiver changes the RF gain in amplifiers 201, 203 and 209 and the LO frequency to reduce any DC offset in the quadrature converter 53 output.

In addition to avoid susceptibility to interference from frequency bands outside the assigned band group the LO should not contain any significant spurious components that fall outside the assigned band group. Since the MB-OFDM system automatically selects a band group of operation that is free of interference the effect of spurious components within the band group may be less severe. In an embodiment the LO spurious components outside the band group should be suppressed at least 60 dB and spurious components inside the band group should be suppressed at least 30 dB. A synthesizer embodiment 211 according to the present invention employs two fixed frequencies to achieve this performance. In the synthesize 211 one frequency is tuned to the center LO frequency F1 and a second frequency is tuned to the frequency offset F2 between the three LO frequencies in a band group.

The three LO frequencies for each band group are then generated by combining these two signals. In particular for the lowest band frequency in a band group, the LO is generated by employing a single sideband mixer to mix F1 with F2 in such a way that the output frequency becomes F1−F2. The middle frequency in a band group is generated directly from F1 without mixing and the upper frequency in a band group is generated by mixing F1 and F2 in a single sideband mixer in a manner that generates an LO signal F1+F2. The resulting frequency can be changed rapidly (hopped) by switching the SSB mixer phasing to generate F1+/−F2 or bypassing the mixer to generate F1. In an embodiment the frequencies F1 and F2 may be generated using phase locked loops 22, 23, 47. The PLLs 22, 23, 47 generates signals that may have very low spurious content so that better than 60 dB spurious suppression may be easily achieved. Accordingly when the desired LO frequency is F1, the LO will be clean. When the desired LO frequency is F1−F2, two spurious components may be generated at F1 and F1+F2. The spurious component at F1 is due to LO leakage and the spurious component at F1+F2 is caused by the finite image rejection achievable in the single sideband mixer. When the desired LO frequency is F1+F2 two spurious components may be generated at F1 and F1−F2. One skilled in the art may develop circuits that may achieve LO rejection and image rejection of 30 dB or better.

FIG. 6A shows the preferred embodiment of such a frequency synthesizer 211. The frequencies for the lowest band group (3.432 GHz, 3.96 GHz and 4.488 GHz) are generated by mixing the output of the phase locked loop 47 (tuned to 1.056 GHz) with of the output of the phase locked loop 22 or passing the output signal at 33 directly through the mixer 26. Phase locked loop 22 is tuned to 7.92 GHz for this band group. The single sideband mixer 26 is controlled to either produce the sum or difference between the two input signals or pass the signal from phase locked loop 22 directly to its output line 44. The resulting frequencies at the input of the divider 31 are 7.92 GHz or 7.92 GHz+/−1.056 GHz.

For this band group the only significant spurious components occur at 7.92 GHz and 7.92−1.056 GHz when the output frequency is 7.92+1.056 and at 7.92 GHz and 7.92+1.056 GHz when the output frequency is 7.92−1.056 GHz. After frequency division by two in the frequency divider 31 the output frequencies are 3.96 GHz or 3.96+/−0.528 GHz, i.e., 3.432 GHz, 3.96 GHz or 4.488 GHz. In an embodiment the LO frequency 3.96 GHz has no significant spurious components. The frequency 3.432 GHz has spurious components at 3.96 GHz and 4.488 GHz and the frequency 4.488 GHz has spurious components at 3.432 GHz and 3.96 GHz. In an embodiment these spurious frequencies are acceptable because the UWB protocol is based on band groups that are free of interference.

Other LO frequencies may be generated in a similar manner resulting in output frequencies that have negligible spurs outside the selected band group. In the synthesizer 211 two separate phase locked loops, 22 and 23 are employed to cover frequencies from 3.564 to 11.88 GHz. Other embodiments may use a single wide band phase locked loop to generate the desired center frequencies of the respective band groups. In another embodiment the frequency multiplier 30, the frequency divider 31, frequency divider 29, and the 1056 MHz phase locked loop 47 may be replaced by a 528 MHz phase locked loop.

As noted in an embodiment the synthesizer 211 employs two phase locked loop type of frequency synthesizers, 22 and 23. The synthesizer 22 output 33 is either mixed with a 1056 MHz signal 35 or passed directly through mixer 26 to a frequency divider 31. The divider 31 may then receive synthesizer 22 output 33 or a frequency that is either 1056 MHz higher or 1056 MHz lower. Accordingly, the divider 31 signal 46 is half the synthesizer 22 output 33 or the synthesizer 22 output 33 shifted by +/−528 MHz (depending on the mode of operation of the mixer 33, which is x+y, x−y, or x where x=synthesizer 22 output 33 and y=1056 MHz). For exampled when band group 1 is selected the synthesizer 22 output 33 frequency is set to 7.92 GHz. The resulting output of the divider 31 is: 3.96 GHz, 3.96+0.528 GHz, 3.96−0.528 GHz. These are the three frequencies in band group 1 (center, left, right). The mixer 26 operation may be changed from bypass, sum, or difference very quickly. The embodiment enables very quick frequency hopping over the three frequencies contained in a band group. With the phase locked loop 22 output 33 is tuned to 11.88 GHz the three possible frequencies generated by mixer 26 and divider 31 are band group 2. Similarly, the phase locked loop 23 output signal 42 may be mixed with a 264 MHz signal. After the frequency multiplier 30 doubles the signal 43, the output signal 45 corresponds to the three frequencies contained in band group 3, 4 or 5. In an embodiment the reference oscillator 21 may have any frequency that makes it possible to generate the set of desired output frequencies. In an embodiment the oscillator 21 may generate a 33 MHz or 22 MHz frequency signal.

While techniques for generating clean phase locked loop signals are well known and effective, the potential mixing of two frequencies in the mixers 26 and 24 may generate spurious components. The mixer 24, 26 output 43, 44 may contain some LO leakage at the phase locked loop frequency and may also generate an image component on the opposite side of the center frequency. In an embodiment any such spurious components are suppressed more than 30 dB through mixer design. In an embodiment the 1056 MHz input signal for mixer 26 and the 264 MHz input signal for mixer 24 are sine-waves having a very low harmonic content to reduce or prevent spurious components outside the selected band group. Such fixed frequency signals may be band-pass filtered using conventional filters. In an embodiment the frequency divider 31, frequency multiplier 30, and the associated switch 54 are physically integrated with the quadrature mixer 53. Such an embodiment may help minimize LO leakage into the receive RF front end because actual LO frequencies will be present only after the divider 31 and the frequency multiplier 30.

It is noted that in order to withstand strong interference from other signals such as IEEE 802.11a, Blue Tooth (2.4 GHz), PCS and cellular signals, the receiver 200 should be able to handle very strong input signals from the antenna switch 242. In an embodiment the antenna switch 242 may contain a high-pass filter to suppress potential signal interference below 3.1 GHz. In an embodiment the initial RF amplifiers 201, 203, 230, 232 and 235 have input matching networks that provides some additional signal interference reduction. In an embodiment the antenna switch 242 has two receive outputs 215. One switch 242 output is coupled to band groups 1, 3, and 5 components. The other switch output line 215 is coupled to band group 2 and 4 components.

This embodiment creates a frequency separation that enables amplifier input matching. In an embodiment the band pass filters 202, 204, 237 and 238 have a pass band of at least 1584 MHz. The pass-band has a fractional bandwidth of 18% to 40%. The interference attenuation and the insertion loss at the UWB band edges may depend on the achievable component Q's. In an embodiment the filters become practical at the designed Q levels. By employing second order Butterworth filters with Q's of 20 and 1 dB bandwidths equal to the band group width of 1584 MHz, the insertion loss at band group 1 and 4 would be 2 dB and 4 dB respectively. In an embodiment all band group signals except band group 2 signals are passed through two notch filters 206 and 208 that suppress the bands used by interfering signals such as IEEE 802.11a. In an embodiment Band group 2 signals bypass the notch filters 206 and 208. In this embodiment the band group 2 notch filtering is bypassed because no interference is present in current IEEE802.11a signal bands. In an embodiment when interference is present in band group 2 the notch filters may be employed.

Figure 7A:
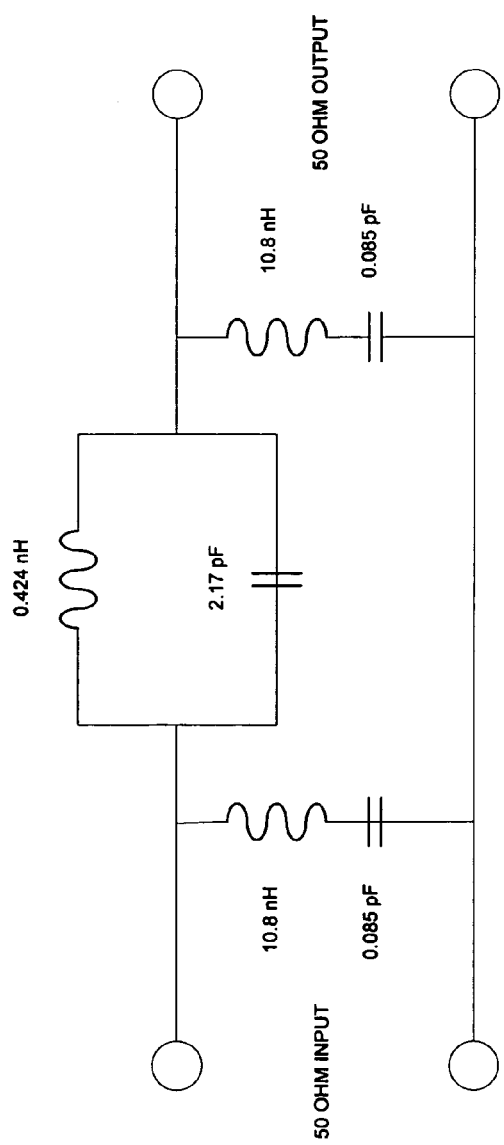
FIGS. 7A and 7B are functional block diagrams of notch filters including nominal component values according to an embodiment of the present invention.
Figure 7B:
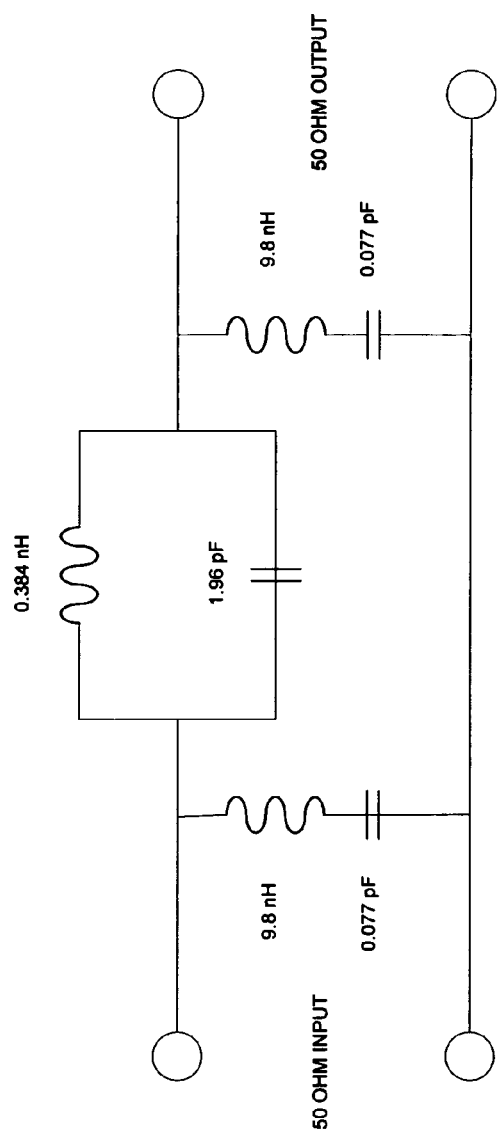

In an embodiment in order to ensure best performance of the A/D converters 225 and 226 the receive gain may be adjusted based on the received signal strength for each band, thereby adjusting the signal level at the input of the A/D converters. In the receiver 200 gain adjustments are made in amplifiers 201, 203, 230, 232, 235 and 209 in addition to the baseband sections 223 and 224. The amplifier 205 may also be designed to provide additional gain control. In an embodiment the gain settings may be changed in less than 5 ns for each frequency band via the RF amplifiers. Gain adjustments in the baseband sections 223 and 224 are performed less frequently. FIGS. 7A and 7B are functional block diagrams of notch filters 206 and 208 respectively including nominal component values according to an embodiment of the present invention. where 50 Ohms input and output impedances are assumed. One skilled in the art may employ other notch filters to achieve the desired frequency response.

While this invention has been described in terms of a best mode for achieving this invention's objectives, it will be appreciated by those skilled in the wireless communications art that variations may be accomplished in view of these teachings without deviating from the spirit or scope of the present invention. For example a near direct down conversion receiver that uses a very low non-zero baseband frequency may be employed in an embodiment. Such an embodiment may use an IF frequency of 264. This embodiment may avoid problems with DC-offset but the baseband bandwidth is twice as wide. In addition, instead of using an antenna switch 242 with two outputs, an embodiment may employ a switch with a single output path coupled to a buffer amplifier that may generate two or more outputs. Such an embodiment may need to maintain dynamic range of the receiver without excessive power consumption.

Another embodiment may employ external filters in place of some or all the RF filters. In an embodiment where the IC is mounted on a Low Temperature Co-fired Ceramic (LTCC) module some of such external filters may be integrated into the LTCC structure. A further embodiment may employ an integrated low pass filter in the RF front end to suppress interference from 2400 MHz, 1900 MHz and the 800 MHz frequency bands. Another embodiment may employ filters that compensate for the frequency offset caused by common variances in capacitance and inductance values. The embodiment may slave the filter tuning capacitors to the variable frequency oscillator of a fixed frequency phase locked loop. In an embodiment the frequency compensation may be set during factory testing.

In a further embodiment band-pass filters having different shapes or frequency responses (other than second order Butterworth responses) may be employed, e.g. Chebyshev or elliptical responses. In addition, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code on a network for remote execution.

What is claimed is:

1. A transceiver for radio communication, the transceiver comprising:
   a frequency synthesizer for creating a local oscillator ("LO") for each of at least three, equal frequency width and equally spaced apart bands, the synthesizer including:
      means for generating a first LO for one of the at least three bands;
      means for generating a second LO set to the spacing between two adjacent bands of the at least three bands; and
      means for combining the first LO and the second LO to generate a LO for each of the at least three bands.

2. The transceiver of claim 1, wherein the means for generating the first LO includes a phase locked loop ("PLL") and the means for generating the second LO includes a phase locked loop ("PLL").

3. The transceiver of claim 2, wherein the first LO is equal to one of half and double the frequency of the center of the at least three bands and the second LO is equal to one of half and double the distance between the center of the at least three bands and an adjacent band of the at least three bands.

4. The transceiver of claim 2, wherein the first LO is equal to the frequency of the center of the at least three bands and the second LO is equal to the distance between the center of the at least three bands and an adjacent band of the at least three bands.

5. The transceiver of claim 4, wherein the transceiver communicates over a plurality of band groups, each band group having at least three, equally spaced apart bands.

6. The transceiver of claim 5, wherein the means for generating a first LO includes means for generating a first LO for one of the at least three bands of a selected band group.

7. The transceiver of claim 4, wherein the transceiver communicates over the at least three, equally spaced bands via a frequency hopping protocol.

8. The transceiver of claim 7, wherein the transceiver fun her includes means for converting a received signal into in-phase and quadrature signals.

9. The transceiver of claim 8, wherein at least a portion of the means for converting a received signal into in-phase and quadrature signals and at least a portion of the frequency synthesizer are integrated together in a single integrated circuit.

10. The transceiver of claim 9, the frequency synthesizer further including means for dividing the plurality of band groups into even and odd groups.

11. A method of transceiving radio communication, the method comprising:
    generating a first LO for one of at least three, equal frequency width and equally spaced apart bands;
    generating a second LO set to the spacing between two adjacent bands of the at least three bands; and
    combining the first LO and the second LO to generate a LO for each of the at least three bands.

12. The method of claim 11, wherein generating the first LO includes generating the first LO via a phase locked loop ("PLL") and generating the second LO includes generating the second LO via a phase locked loop ("PLL").

13. The method of claim 12, wherein the first LO is equal to one of half and double the frequency of the center of the at least three bands and the second LO is equal to one of half and double the distance between the center of the at least three bands and an adjacent band of the at least three bands.

14. The method of claim 12, wherein the first LO is equal to the frequency of the center of the at least three bands and the second LO is equal to the distance between the center of the at least three bands and an adjacent band of the at least three bands.

15. The method of claim 14, wherein the method communicates over a plurality of band groups, each band group having at least three, equally spaced apart bands.

16. The method of claim 15, wherein generating the first LO includes generating the first LO for one of the at least three bands of a selected band group.

17. The method of claim 14, wherein the method communicates over the at least three, equally spaced bands via a frequency hopping protocol.

18. The method of claim 17, further including converting a received signal into in-phase and quadrature signals.

19. The method of claim 18, further including dividing the plurality of band groups into even and odd groups.

20. The method of claim 19, further including filtering one of the plurality of band groups and preventing significant interference in an adjacent one of the plurality of band groups.

21. An article of manufacture for use in transceiving radio communication, the article of manufacture comprising computer readable storage media including program logic embedded therein that causes control circuitry to perform:
    generating a first LO for one of at least three, equal frequency width and equally spaced apart bands;
    generating a second LO set to the spacing between two adjacent bands of the at least three bands; and
    combining the first LO and the second LO to generate a LO for each of the at least three bands.

22. The article of manufacture of claim 21, wherein generating the first LO includes generating the first LO via a phase locked loop ("PLL") and generating the second LO includes generating the second LO via a phase locked loop ("PLL").

23. The article of manufacture of claim 22, wherein the first LO is equal to one of half and double the frequency of the center of the at least three bands and the second LO is equal to one of half and double the distance between the center of the at least three bands and an adjacent band of the at least three bands.

24. The article of manufacture of claim 22, wherein the first LO is equal to the frequency of the center of the at least three bands and the second LO is equal to the distance between the center of the at least three bands and an adjacent band of the at least three bands.

25. The article of manufacture of claim 24, wherein the communication is over a plurality of band groups, each band group having at least three, equally spaced apart bands.

26. The article of manufacture of claim 25, wherein generating the first LO includes generating the first LO for one of the at least three bands of a selected band group.

27. The article of manufacture of claim 24, wherein the communication is over the at least three, equally spaced bands via a frequency hopping protocol.

28. The article of manufacture of claim 27, further performing converting a received signal into in-phase and quadrature signals.

29. The article of manufacture of claim 28, further performing dividing the plurality of band groups into even and odd groups.

30. The article of manufacture of claim 29, further performing filtering one of the plurality of band groups and preventing significant interference in an adjacent one of the plurality of band groups.

* * * * *